(12) United States Patent
Haberkamp et al.

(10) Patent No.: US 7,913,858 B2
(45) Date of Patent: Mar. 29, 2011

(54) ACID-NEUTRALIZING FILTER MEDIA

(75) Inventors: William C. Haberkamp, Cookeville, TN (US); David M. Stehouwer, Columbus, IN (US); Barry M. Verdegan, Stoughton, WI (US)

(73) Assignee: Fleetguard, Inc., Nashville, TN (US)

( * ) Notice: Subject to any disclaimer, the term of this patent is extended or adjusted under 35 U.S.C. 154(b) by 253 days.

(21) Appl. No.: 11/775,282

(22) Filed: Jul. 10, 2007

(65) Prior Publication Data

US 2007/0267341 A1 Nov. 22, 2007

Related U.S. Application Data

(62) Division of application No. 10/916,299, filed on Aug. 11, 2004, now Pat. No. 7,250,126.

(51) Int. Cl.
 *B01D 15/20* (2006.01)
 *B01D 29/00* (2006.01)
 *B01D 29/05* (2006.01)

(52) U.S. Cl. ........ 210/501; 210/483; 210/488; 210/489; 210/502.1; 210/503; 210/504; 210/505; 210/506; 210/507; 210/508; 210/509

(58) Field of Classification Search ............... 210/483, 210/488, 489, 501, 502.1, 503, 504, 505, 210/506, 507, 508, 509
See application file for complete search history.

(56) References Cited

U.S. PATENT DOCUMENTS

| | | | |
|---|---|---|---|
| 2,316,080 A | 4/1943 | Loane et al. | |
| 2,617,049 A | 11/1952 | Asseff et al. | |
| 2,647,889 A | 8/1953 | Watson et al. | |
| 2,835,688 A | 5/1958 | Le Suer | |
| 3,172,892 A | 3/1965 | Le Suer et al. | |
| 4,105,571 A | 8/1978 | Shaub et al. | |
| 4,334,994 A | 6/1982 | Jensen | |
| 4,521,493 A | 6/1985 | Class | |
| 4,808,742 A | 2/1989 | Fleming | |
| 4,906,389 A | 3/1990 | Brownawell et al. | |
| 5,042,617 A | 8/1991 | Brownawell et al. | |
| 5,051,391 A * | 9/1991 | Tomisawa et al. | 502/242 |
| 5,068,044 A | 11/1991 | Brownawell et al. | |
| 5,069,799 A * | 12/1991 | Brownawell et al. | 210/749 |
| 5,112,482 A | 5/1992 | Shaub et al. | |
| 5,156,758 A | 10/1992 | Thaler et al. | |
| 5,164,101 A | 11/1992 | Brownawell et al. | |
| 5,178,768 A | 1/1993 | White, Jr. | |
| 5,209,839 A | 5/1993 | Shaub et al. | |
| 5,225,081 A | 7/1993 | Brownawell | |

(Continued)

FOREIGN PATENT DOCUMENTS

CN 1205908 1/1999

(Continued)

OTHER PUBLICATIONS

English Abstract of JP 6-346720; Published Dec. 20, 1994.

(Continued)

*Primary Examiner* — John Kim

(74) *Attorney, Agent, or Firm* — Andrus, Sceales, Starke & Sawall, LLP; J. Bruce Schelkopf

(57) ABSTRACT

Acid-neutralizing filter media includes filter media fibers in combination with a strong base of small particle size and high surface area attached to and immobilized on the filter media fibers, and methodology therefore.

20 Claims, 4 Drawing Sheets

U.S. PATENT DOCUMENTS

| | | | |
|---|---|---|---|
| 5,225,091 | A | 7/1993 | Gutierrez et al. |
| 5,288,402 | A * | 2/1994 | Yoshida .................. 210/488 |
| 5,300,234 | A * | 4/1994 | Oechsle et al. ............ 210/778 |
| 5,324,363 | A | 6/1994 | Robbins et al. |
| 5,348,755 | A | 9/1994 | Roy |
| D352,990 | S | 11/1994 | Sparks et al. |
| 5,478,463 | A | 12/1995 | Brownawell et al. |
| 5,565,128 | A | 10/1996 | Gutierrez |
| 5,580,484 | A | 12/1996 | Gutierrez |
| 5,720,803 | A * | 2/1998 | Itoh et al. ............. 106/168.01 |
| 5,756,431 | A | 5/1998 | Emert et al. |
| 5,758,669 | A * | 6/1998 | Taniguchi et al. ........... 131/340 |
| 5,777,572 | A | 7/1998 | Janusas |
| 5,783,735 | A | 7/1998 | Emert et al. |
| 5,792,730 | A | 8/1998 | Gutierrez et al. |
| 5,854,186 | A | 12/1998 | Cusumano et al. |
| 5,872,084 | A | 2/1999 | Emert et al. |
| 5,925,243 | A | 7/1999 | Clark et al. |
| 5,945,211 | A * | 8/1999 | Yamaguchi et al. ........... 428/325 |
| 6,103,122 | A * | 8/2000 | Hou et al. ................. 210/502.1 |
| 6,379,564 | B1 | 4/2002 | Rohrbach et al. |
| 6,478,953 | B2 | 11/2002 | Spearman et al. |
| 6,478,958 | B1 | 11/2002 | Beard et al. |
| 6,505,597 | B2 | 1/2003 | Zulauf et al. |
| 6,517,725 | B2 | 2/2003 | Spearman et al. |
| 6,537,453 | B2 | 3/2003 | Beard et al. |
| 6,570,173 | B1 | 5/2003 | Kunkel et al. |
| 6,919,023 | B2 | 7/2005 | Merritt et al. |
| 7,011,574 | B2 * | 3/2006 | Simpson et al. ............. 451/526 |
| 7,063,733 | B2 * | 6/2006 | Mori et al. ...................... 96/135 |
| 2003/0070990 | A1 | 4/2003 | Rohrbach et al. |
| 2003/0111398 | A1 | 6/2003 | Eilers et al. |
| 2004/0178142 | A1 * | 9/2004 | Koslow .................... 210/500.29 |
| 2005/0235619 | A1 * | 10/2005 | Heinz et al. .................... 55/486 |

FOREIGN PATENT DOCUMENTS

| | | |
|---|---|---|
| CN | 1387936 | 1/2003 |
| EP | 0 416 907 | 3/1991 |
| EP | 0 416 906 | 8/1995 |
| EP | 0 275 148 | 7/1997 |
| EP | 0 703 959 | 10/2002 |
| JP | 6-346720 | 12/1994 |
| WO | WO-93/00416 | 1/1993 |

OTHER PUBLICATIONS

English Abstract of CN 1387936; Published Jan. 1, 2003.
English Abstract of CN 1068751; Published Feb. 10, 1993.
English Abstract of CN 1205908; Published Jan. 27, 1999.
English Abstract of CN 85104492; Published Dec. 24, 1986.
*Soot and Acid Control in Diesel Lube Systems*, Brent Birch, 2004, 6th International Filtration Conference Proceedings, SWRI.

* cited by examiner

ACID-NEUTRALIZING FILTER MEDIA

CROSS REFERENCE TO RELATED APPLICATION

This application is a division of U.S. patent application Ser. No. 10/916,299, filed Aug. 11, 2004 now U.S. Pat. No. 7,250,126.

BACKGROUND AND SUMMARY

The invention relates to acid-neutralizing filter media for a liquid filter in a liquid filtration system, including diesel lubricant filters.

The invention arose during continuing development efforts directed toward diesel lubricant filters removing combustion acids in the lube oil circulated by the diesel engine lubricant circulation system, though the invention has broader application. It is known in the prior art to provide a filter with a strong base for reacting with lubricant containing combustion acids neutralized by a weak base to a neutral salt in the engine lubricant circulation system, for example as noted in U.S. Pat. No. 4,906,389, incorporated herein by reference. In the prior art, combustion acids are neutralized by a weak base in the oil. The neutralized acid is transported to a filter containing a strong base where the acid exchanges weak base in solution for strong base on the filter and forms an insoluble, neutralized, immobile salt deposit that is retained on the filter. The replaced weak base returns to the circulation system for reuse to neutralize further combustion acids, for example at the piston ring zone. The cycle then continues, namely the weak base neutralizes the combustion acids to form neutral salts which are transported from the piston ring zone with the lubricating oil and circulated through the lubricant circulation system including the filter, whereat the strong base replaces the weak base and retains the combustion acids as immobilized deposits on the filter media.

The present invention developed from continuing efforts to improve attachment of the strong base to the filter media.

DETAILED DESCRIPTION

Figure 1:
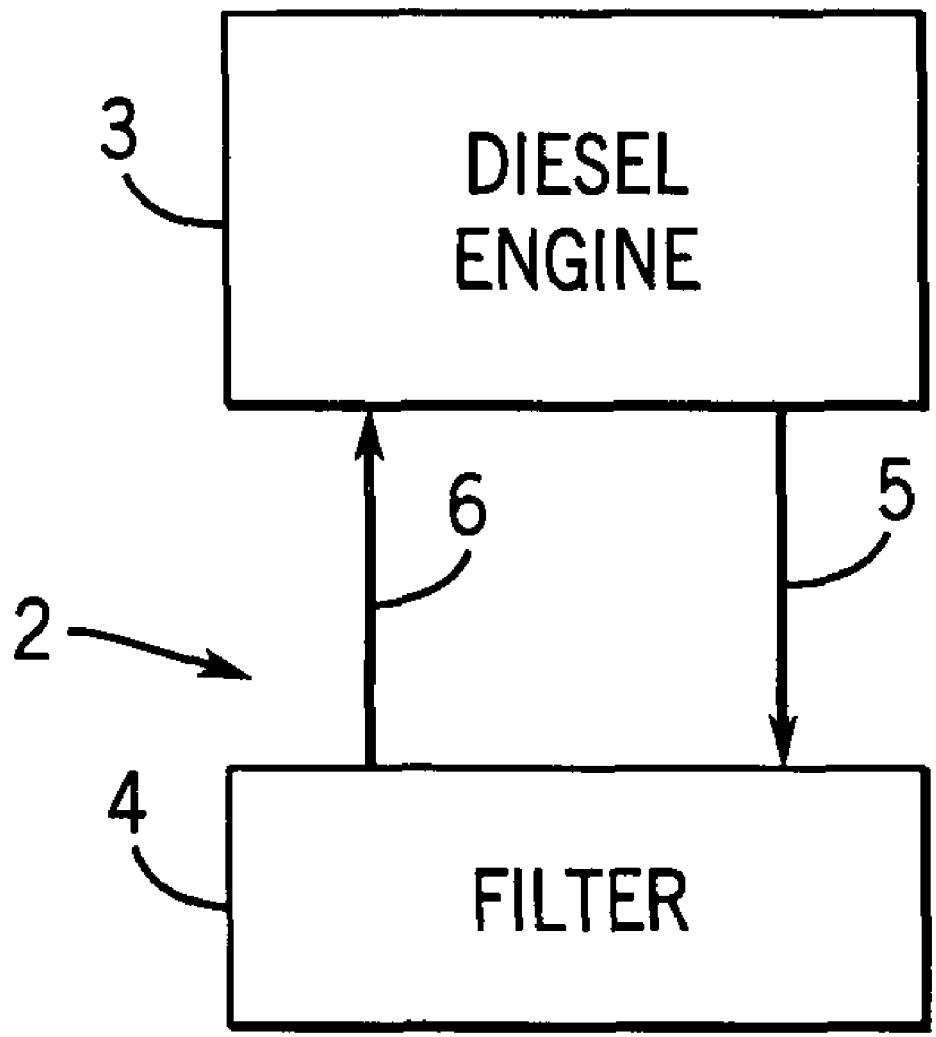
FIG. 1 schematically shows an engine lubricant circulation system including a filter made in accordance with the invention.

FIG. 1 shows a liquid filtration system 2 for an internal combustion engine such as diesel engine 3, and including filter 4 receiving lubricant from the engine as shown at arrow 5, and returning clean filtered lubricant to the engine as shown at arrow 6. As noted in the incorporated '389 patent, the optimum functioning of an internal combustion engine (especially a diesel engine) requires that fuel combustion acids (e.g., carboxylic, nitric, nitrous, sulfuric and sulfurous acids—with or without alkyl groups) be neutralized where they first contact the lubricant, i.e., in the piston/ring belt area. In the absence of this acid neutralization, the lubricant is degraded, its viscosity rapidly increases, corrosion occurs and engine deposits are formed. This results in increased oil consumption and engine wear. Traditionally metal-containing (i.e. ash-containing) detergents (e.g., barium, calcium, or magnesium overbased sulfonates, salicylates or phenates) have been used to neutralize combustion acids (See, for example, U.S. Pat. Nos. 2,316,080; 2,617,049; 2,647,889; and 2,835,688). In the absence of metal detergents, as for example in ashless oils, polyethyleneamine based dispersants have been used for neutralization (see, for example, U.S. Pat. No. 3,172,892, the disclosure of which is incorporated herein by reference). However, ashless detergents are generally not used in lubricating oils because polyethyleneamines are less cost effective than ash-containing detergents and normally do not maintain adequate TBN (Total Base Number). It is known in the prior art to provide lube oil filters or other suitable devices containing strong bases to extend the life of conventional diesel lubricants and to operate in conjunction with ashless lubricants containing specific amine compounds. This arrangement is attractive for use with low ash or ashless diesel lubricants in applications where oil life is limited by TBN loss.

It is has been found that attachment and immobilization of the acid-neutralizing strong base to the filter media is a challenge which must be overcome. Certain attachment methods have been found to be particularly desirable and enabling.

In one aspect, it has been found particularly desirable to use an acid-neutralizing base of particle diameter size less than 10 μm (microns), and further preferably less than 5 μm. The acid-neutralizing base should have specific surface area of greater than 10 $m^2/gm$ (square meters per gram). It should also be insoluble or sparingly soluble in water and in oil, in order to obtain a uniform coating with high surface area and strong adhesion to the filter media. It should also be a stronger base than the weak bases in the liquid. Pre-treatment of the strong base should be optimized for performance. For example, mild heating pretreatment reduces dust and media migration. However, high temperature heating, as is commonly practiced, results in calcining that reduces the surface area and chemical activity of the base. This is further particularly desirable in combination where the filter media is paper, and further preferably cellulose, and is incorporated in the paper making process, to be described. The base is preferably selected from the group consisting of metal oxides, metal hydroxides, metal carbonates, metal bicarbonates, Lewis bases, sacrificial metals, and mixtures thereof, and further preferably the metal oxides are selected from the group consisting of MgO, CaO, MnO, $MnO_2$, ZnO, BaO, $TiO_2$, and the hydroxides and carbonates are selected from the group consisting of $Mg(OH)_2$, $MgCO_3$, $Ca(OH)_2$, $CaCO_3$, $NaAlO_2$, $Na_2CO_3$, NaOH, $Al(OH)_3$, $NaHCO_3$. As noted, the base can be a sacrificial metal, e.g. zinc (Zn), magnesium (Mg), providing a sacrificial anodic reaction. When using sacrificial metals, care should be taken in order to minimize catalytic oxidation of the oil by the metal. Desirable aspects of the small particle size include high chemical activity, high surface area, and low re-entrainment of base material or fiber from the medium. While it is desirable to choose base material having high chemical activity in combination with fine particle size and high surface area, it also presents a challenge for immobilizing such particles in filter media. Chemical activity in a two phase (liquid/immobilized solid) system is a function of the available surface area. The smaller the particle size, the greater the surface area, and the greater the challenge to fix the solid to the fibers. A key feature hereof is the means to bind small particles, less than 5 to 10 μm in size, to the media in a way that maximizes chemical activity and minimizes media migration.

Cellulose is chosen for many liquid filtration applications due to relatively low cost and ease of manufacture using known paper machine technology. For example, filter 4 may be a stacked disc filter as shown in U.S. Pat. No. 4,334,994, incorporated herein by reference, having cellulose filter media discs made on a traditional Fourdrinier paper machine. Other types of filters may be used, such as spin-on filters, cartridges filters, wall-flow filters and others. The present system provides a method for attaching an acid-neutralizing base to filter media for a liquid filtration system, including providing a slurry of filter media material, for example cellulose fibers in preferred form, mixing the base material in the slurry, attracting and bindingly attaching the base material to the filter media material, and drying the slurry to filter media having the acid-neutralizing base immobilized thereon.

Further in the preferred embodiment, two chemical systems are employed to improve fine particle retention in the aqueous state as the paper is formed, in the dry state of the resulting medium, and in the oil-wetted state in which the filter is used.

To improve the wet retention of the fine particles of base material, preferably added as fine powders in the slurry, as the medium is formed, the first chemical means uses an ionic additive added to the slurry to create a polarity difference between the filter media material and the base material, i.e. such that one of either the base material or filter media is positively charged while the other is negatively charged. The ionic additive is preferably selected from the group consisting of ammonium aluminum sulfate, magnesium sulfate, ammonium, and aluminum sulfate, although other ionic additives may also be used. In the absence of the ionic additive, cellulose is dominated by hydroxyl groups which are negative in charge, and various base materials such as magnesium oxide are also dominated by a negative charge. Thus, the media and base particles would not normally attract, and the pH of the system would be greater than pH 7. Upon addition of an ionic additive with appropriate cations, such as magnesium, aluminum or ammonium, the media and base particles become oppositely charged due to their different adsorption affinities for the cation and a floc is formed. Alternatively, the pH of the slurry can be lowered to achieve the same effect. In one embodiment, the pH of the mixture of the filter media material and base material is monitored, and if the pH is above about 9, the ionic additive is added to the mixture to lower the pH to less than about 9. A good floc has been observed while still above pH 7, and it is only necessary that the pH of the slurry be lowered a small amount which may be about 0.5. This will effect the necessary charge reversal of the hydroxyl functionality on the cellulose fiber. When the base material and fibers are oppositely charged, wet retention of the base material particles is improved and the fibers are coated more uniformly by the base material. Electrokinetic methods, such as electrophoresis or streaming potential can be used to measure the charge on the materials and optimize slurry conditions.

The first chemical means alone does not impart sufficient dry strength nor strength in oil. In a second chemical means, an adhesive binder, such as acrylic latex, fibrillated acrylic fiber, or other adhesive binder, is used to enhance the strength dry and in oil and to facilitate handling during manufacture. The preferred embodiment further involves adding an adhesive binder to the slurry to enhance retention of the base material in a dry state after drying of the slurry and to improve adhesion of the binder in the oil-wetted state. The adhesive binder is preferably selected from the group consisting of acrylic latex, phenolic, butadiene copolymers, vinyl copolymers, latexes, isocyanates, novolacs, resols, emulsion polymer binders and/or latex resins, including acrylic, vinyl acetate, vinyl chloride, styrene butadiene, poly vinyl alcohol, nitrile, epoxy. The acrylic latex may be chosen from a group of preferably cationic or anionic materials such that wet retention of the binder is enhanced in the same manner as the base material. It is also possible that the base and latex compete for attraction to these oppositely charged sites and could preferably co-locate or result in latex and base particles in intimate contact. The advantage is that when cured the latex may form then cohesive bonds between the fibrous structure and base particles.

In another embodiment, fibrillated acrylic fiber is added to the slurry to enhance retention of the base material to the filter media material. It has been found that about 2 to 3% by weight added fibrillated acrylic fiber increases the retention and lowers the mean pore size of the furnish. This results in improved mechanical retention and uniformity of the resulting web. The fiber diameter should be smaller than the coarser cellulose paper fiber. Other types of fibrillated fiber may be used, as well as other mechanical retention means.

In a further embodiment, polyelectrolytes are added to the slurry to accomplish both of the noted functions of retention of the base material in the wet state and retention of the base material in the dry and oil-wetted states. The polyelectrolytes provide both the ionic additive and the adhesive binder to provide a dual function of wet and dry retention of the base material. An exemplary polyelectrolyte is diallyldimethylammoniumchloride. In a further embodiment, the reaction chemistry of the process may be further simplified through the use of: (a) a latex with cationic functional groups, such that the latex itself supplies both the cationic groups to replace the positive charges (in lieu of aluminum, ammonium, magnesium or polyelectrolyte) and the binder; and/or (b) polyelectrolytes, with acrylamide or other suitable functionalities, molecular weight and charge density. In one embodiment, a suspension of cationic latex or solution containing polyelectrolytes is added to a slurry containing the base material. A floc is formed as negatively charged base material is attracted to the positively charged latex or the polyelectrolyte. The resultant slurry is then added to a second slurry containing filter media material. The negatively charged filter media material and positive or neutrally charged floc are attracted to one another resulting in increased wet strength and, upon mild heating, yields a furnish with increased dry strength and strength in oil.

In the preferred embodiment, the diameter of the particles of base material is less than half the diameter of the fibers of the cellulose paper filter media material. The cellulose fiber diameter is typically in the range of 20 to 30 µm, and the base material particle diameter is less than 10 µm, and preferably less than 5 µm. When used in an internal combustion engine lubricant circulation system application, the strong base material particle size is chosen small enough to enhance retention and immobilization thereof on the filter media and also such that in the event of unintended migration of the particles from the filter media, such particles are small enough to pass through the internal combustion engine lubricant circulation system and return to the filter for capture. It is known that particles larger than about 10 µm cause increased wear in engine lubrication systems. From filtration theory, it is known that particles with diameters equal to or larger than the fiber diameter are easily re-entrained by fluid flow and may not be effectively retained by filter media.

The filter media material is preferably made by a traditional paper making process, as noted above. The base material is preferably added by inclusion during the paper making process. The filter media material is provided in the form of a plurality of fibers. The acid-neutralizing base material is provided in the form of a plurality of particles in a powder. A binder is provided in the form of a resin, latex or other means. The method involves combining and mixing a combination of the fibers, powder and resin in a slurry, and drying the slurry to form the filter media. In one embodiment, a second set of fibers is added to the slurry, namely fibrillated acrylic fibers. In further embodiments, an ionic additive (e.g. ammonium, aluminum sulfate, magnesium sulfate, polyelectrolyte, cationic latex) is added to the slurry to alter the relative charge between the fibers and the particles in the powder to a polarity such that the particles are attracted to and attached to the fibers.

EXAMPLE

Laboratory samples were prepared by first mechanically re-pulping or dissociating the fibrous cellulose structure of Fleetguard's stacked disc filter media of the above noted incorporated '994 patent, produced by Fleetguard, Inc., 2931 Elm Hill Pike, Nashville, Tenn. 37214. The media is prepared on a commercial Fourdrinier paper machine from a mixture of cellulose fibers including recycled materials and other commercially available softwood or hardwood fibers. Typically the most critical parameters include the basis weight of the product which is about 300 grams per square meter and a thickness of about 1.0 mm with a Gurley Permeability of 16 seconds per 300 cc with 5 ounce cylinder. Pulp from the paper in approximately 3 equal portions totally 18 grams was added to a 1 liter Waring blender and dissociated on high for 1 minute each portion. The resulting portions were combined in a larger container. Approximately 0.7 grams dry weight of fibrillated acrylic fiber (Sterling Fiber CFF V114-3) was added to the 1 liter Waring blender and the material was dissociated on high for 2 minutes. This fiber slurry was also added to the larger container containing the paper pulp. To this container 11 grams of fine magnesium oxide powder (Martin Marietta, Magnesia Specialties HP-ER) is added. Added to the larger container again, was 1.2 grams wet latex resin (Noveon Hycar 26-138). The resulting combination was thoroughly mixed using a stirrer. Once thoroughly mixed the pH of the solution was measured. Typically it was recorded at about pH of 9 to 10. Added to this mixture was a 70% solution of aluminum ammonium sulfate until a slight decrease in PH was measured. This was typically about 2 to 3 ml of solution and was accompanied by a visible flocking of the fiber slurry and coagulation of the resin. The mixture was then added to a 12 inch by 12 inch laboratory handsheet former which had previously been filled with the correct amount of water or about 20 liters that had also been adjusted with ammonium aluminum sulfate to a pH of about 6.5. The slurry was mixed with the water in the upper portion of the handsheet former and then the forming device was allowed to drain. The slurry of fibers, powder and resin was collected on the screen of the forming device, removed, blotted and dried in a laboratory drier. The resulting paper structure was examined for physical properties. It was found that the dry basis weight was approximately 300 grams per square meter, the thickness approximately 1.08 mm and the Gurley Permeability about 12 seconds per 300 cc. These physical properties compare very favorably with the desired properties of the noted Fleetguard stacked disc media. In addition the media was burned in a 500° C. oven and found to have about 26% ash resulting from magnesium oxide.

The resulting media sample was cut to fit a round sample holder of about 6 inches in diameter and yielded a media sample of about 6 grams. The sample holder was capable of flowing mineral oil at a rate of about 1 liter per minute from a recirculating sump. The sump was filled with about 500 grams of mineral oil. The infra-red spectrum of the mineral oil was analyzed particularly in the region of 1400 to 1800 $cm^{-1}$ (reciprocal centimeters). A distinct peak at about 1456 $cm^{-1}$ was observed and measured to be about 54.5 units. 10 grams of n-Heptanoic Acid was added to the sump, mixed and the infrared spectrum was again examined. A new and distinct peak at about 1713 $cm^{-1}$ was observed and measured. The area of this peak was about 10.9 units and the 1456 $cm^{-1}$ peak remained at about 54.5 units. Flow was initiated through the media sample in the media holder at a rate of about 1 liter per minute and regular samples were withdrawn from the sump for infrared analysis. Table 1 gives the results and elapsed time. After about 6 hours of recirculation of the Heptanoic Acid in mineral oil solution there was a 48% reduction in the integrated peak for Heptanoic Acid. A similar test with unmodified filter media showed a change of about 5% over the same period. The conclusion of this test was that the acid is being neutralized or held by the magnesium oxide of the experimental media. The first column is time in hours, and the second and third columns show the relative concentration units (dimensionless, integrated area under peak) for the mineral oil (MO) peak observed at a wavelength of 1456 $cm^{-1}$ and for the Heptanoic Acid (HA) peak observed at a wavelength of 1713 $cm^{-1}$.

TABLE 1

| Time (hours) | 1456 $cm^{-1}$ MO peak | 1713 $cm^{-1}$ HA peak |
| --- | --- | --- |
| 0 | 54.45 | 10.93 |
| 0.08 | 54.32 | 10.16 |
| 2 | 53.35 | 6.33 |
| 6 | 54.25 | 5.70 |
| 8 | 55.32 | 5.70 |
| 23 | 55.13 | 5.60 |

A set of standard concentrations of Heptanoic Acid (HA) in mineral oil (MO) were prepared to determine the correlation between the integrated peak and acid levels and confirm the conclusion of the previous experimental result. The results, Table 2, showed a very linear response which supported the analysis.

TABLE 2

| conc HA / (HA+MO) | 1456 $cm^{-1}$ MO peak | 1713 $cm^{-1}$ HA peak |
| --- | --- | --- |
| 0.00% | 53.08 | 0.00 |
| 0.20% | 55.02 | 1.32 |
| 0.40% | 54.99 | 2.60 |
| 0.80% | 54.97 | 5.06 |
| 1.20% | 54.63 | 7.10 |
| 1.59% | 53.42 | 9.51 |

Similar experiments were conducted in various other conditions including the use of experimental motor oils and used oils from engine testing. While some of these oils contain bases which are also capable of acid neutralization, our experiments confirm the action of the media in further neutralization of acids such as Heptanoic Acid as a model acid. Additionally, oil analysis has been conducted during some of these evaluations to look for the presence of elemental magnesium in the oil. Results showed very little change in magnesium level, only a few (5 to 10) parts per million, indicating that the magnesium is strongly held within the experimental media samples. Additional experiments have been conducted to study the retention of the magnesium oxide particles in the media production. It has been found that Epsom salts or magnesium sulfate may be used in place of ammonium aluminum sulfate as can ammonium or aluminum sulfate. Other polymer flocculants have also been examined and considered as they are widely available. In our investigation magnesium oxide was the preferred base material because its low molecular weight and divalent chemistry would allow high acid neutralization without high gram levels of added material. Certainly other water insoluble materials could be used such as calcium oxide or zinc oxide or others.

Figure 2:
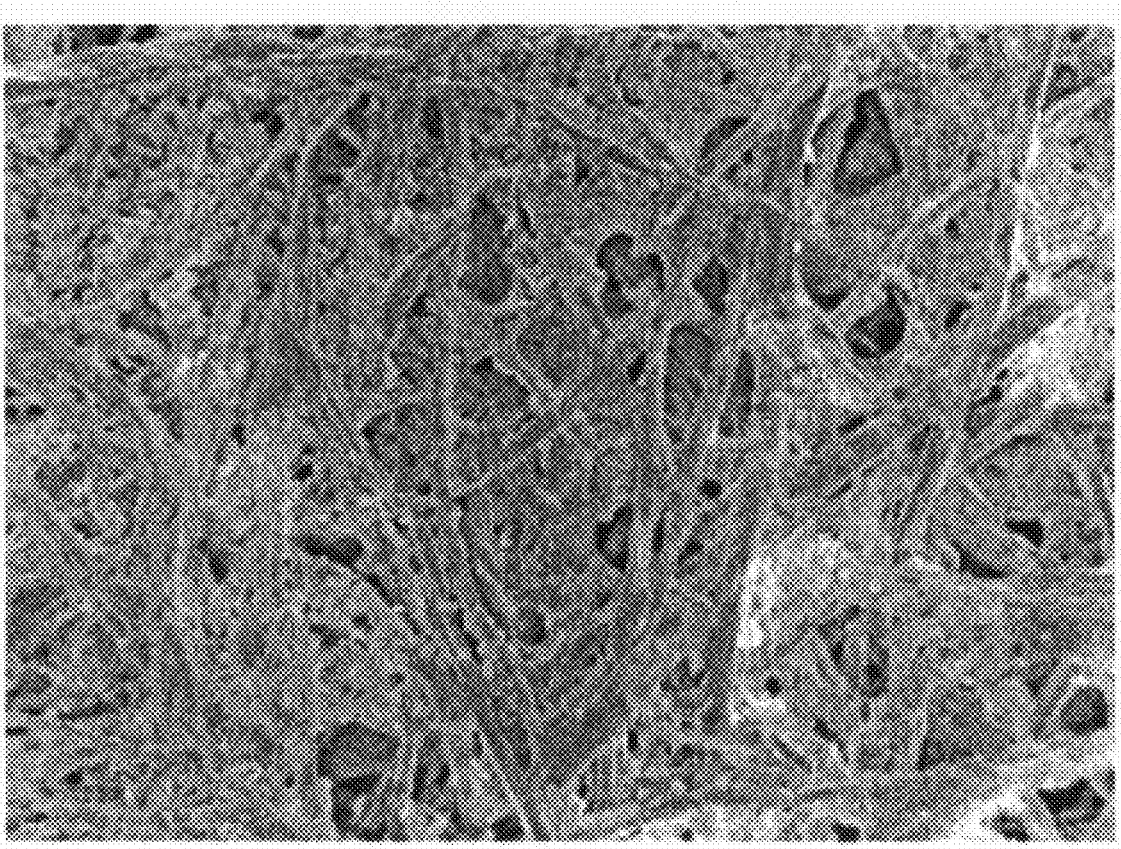
FIG. 2 is a scanning electron microphotograph.

FIG. 2 is a scanning electron microphotograph at 100× (100 times magnification) of cellulose media approximately 25% loaded with magnesium oxide particles adhered to fiber surfaces. The fiber is approximately 20 to 30 μm in diameter, and the MgO has a particle diameter size less than 10 μm. A relatively open or unchanged pore structure is maintained.

Figure 3:
FIG. 3 is a scanning electron microphotograph.
Figure 4:
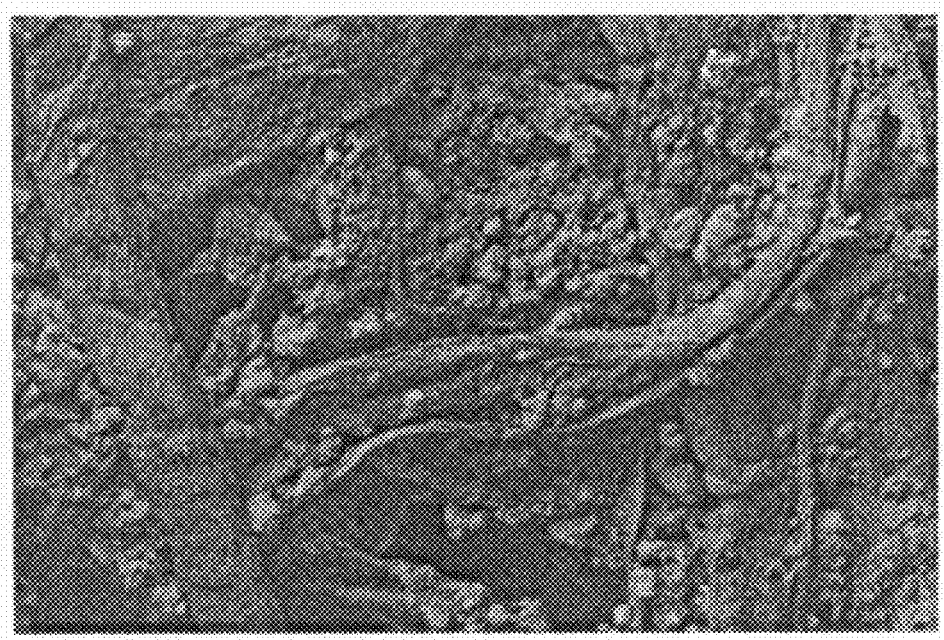
FIG. 4 is a scanning electron microphotograph.
Figure 5:
FIG. 5 is an energy dispersive X-ray spectroscopy elemental map.
Figure 6:
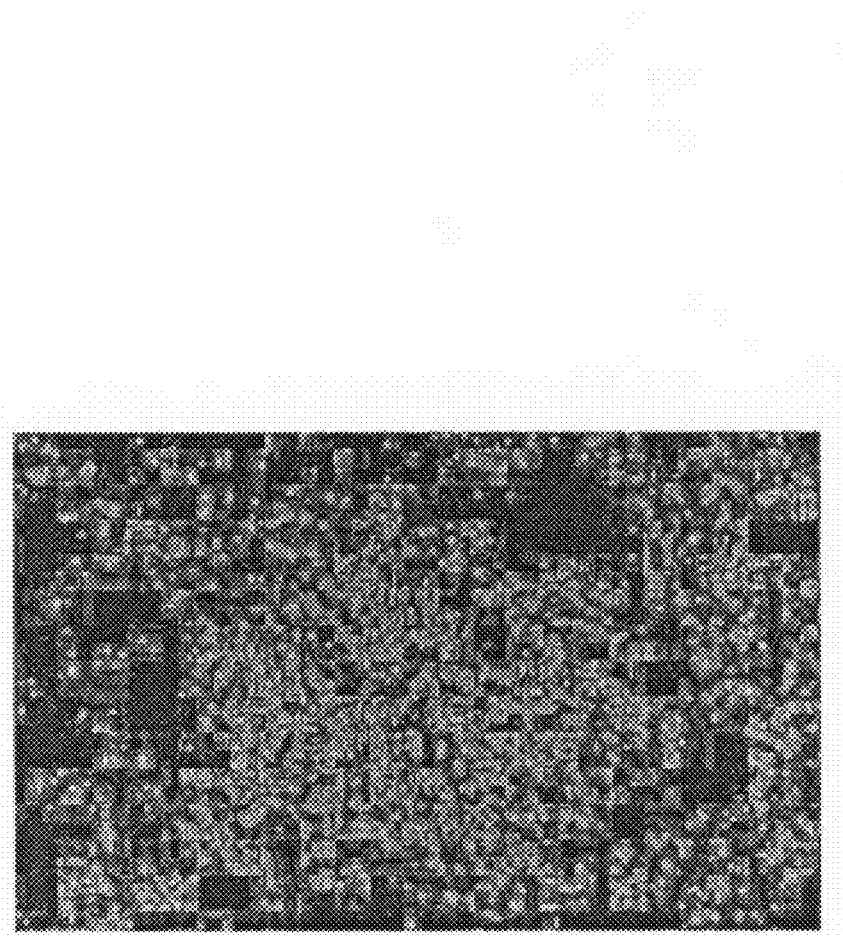
FIG. 6 is an energy dispersive X-ray spectroscopy elemental map.

FIG. 3 is a scanning electron microphotograph at 500× showing the filter media fibers prior to loading with magnesium oxide. FIG. 4 is a scanning electron microphotograph at 500× of the filter media of FIG. 3 after loading with magnesium oxide. FIGS. 5 and 6 are energy dispersive X-ray spectroscopy elemental maps of the structures of FIGS. 3 and 4, respectively, tuned to magnesium energy level wavelengths, and illustrating the presence of magnesium in FIG. 4 at the trace dots in FIG. 6, as compared to the absence thereof in FIG. 5.

The invention provides acid-neutralizing filter media for a liquid filter including filter media fibers of diameter greater than 1 μm in combination with particles of acid-neutralizing base material of diameter less than one-half the diameter of the filter media fibers and attached to and immobilized on the filter media. In one embodiment, the particles are attached to and immobilized on the filter media fibers by electrostatic attraction between the particles and the filter media fibers. In another embodiment, the particles are attached to and immobilized on the filter media fibers by an adhesive binder. In another embodiment, the particles are attached to and immobilized on the filter media fibers by both electrostatic attraction between the particles and the filter media fibers and by an adhesive binder. In another embodiment, the particles are attached to and immobilized on the filter media fibers by a polyelectrolyte. In another embodiment, the particles are attached to and immobilized on the filter media fibers by a second set of fibers. In the preferred embodiment, the second set of fibers are selected from the group consisting of polypropylene, polyethylene, polyaramid (e.g. Kevlar), polyamide, fibrous glass, and cellulose. In one embodiment, the second set of fibers have diameter one order of magnitude smaller than the filter media fibers. In a further embodiment, the second set of fibers have a diameter in the range 0.5 to 3 μm. In another embodiment, the second set of fibers are fibrillated fibers, and in a further embodiment are fibrillated acrylic fibers. The second set of fibers have a diameter smaller than the filter media fibers, to provide a relative coarse and fine fiber matrix combination improving entanglement and capture of the particles of acid-neutralizing base material in the matrix, with the filter media fibers providing the relative coarse fibers, and the noted second set of fibers providing the relative fine fibers.

The invention provides acid-neutralizing filter media for a liquid filter including in combination acid-neutralizing base material of surface area greater than 10 m²/gm and particle diameter size less than 10 μm attached to and immobilized on filter media fibers. In one embodiment, the filter media is paper, and in a further embodiment is cellulose. The base is preferably selected from the group consisting of metal oxides, metal hydroxides, metal carbonates, metal bicarbonates, Lewis bases, sacrificial metals, and mixtures thereof, and further preferably the metal oxides are selected from the group consisting of MgO, CaO, MnO, $MnO_2$, ZnO, BaO, $TiO_2$, and the hydroxides and carbonates are selected from the group consisting of $Mg(OH)_2$, $MgCO_3$, $Ca(OH)_2$, $CaCO_3$, $NaAlO_2$, $Na_2CO_3$, NaOH, $Al(OH)_3$, $NaHCO_3$.

The invention provides a method for attaching an acid-neutralizing base to filter media for a liquid filtration system, including providing a slurry of filter media material, mixing base material in the slurry, attracting and bindingly attaching the base material to the filter media material, and drying the slurry to filter media having the acid-neutralizing base immobilized thereon. One embodiment involves adding fibrillated fiber to the slurry to enhance retention of the base material to the filter media material, and in a further embodiment the fibrillated fiber is acrylic. In another embodiment, the filter media includes filter media fibers, and the fibrillated fiber has a diameter in the range one-half to one-tenth the diameter of the filter media fibers. Another embodiment involves adding an ionic additive to the slurry to alter the relative charge between the filter media material and the base material such that one is positively charged and the other is negatively charged such that the base material is attracted to the filter media material to enhance retention of the base material. In one embodiment, the ionic additive is selected from the group consisting of ammonium aluminum sulfate, magnesium sulfate, ammonium, aluminum sulfate, sodium hydroxide, and other pH modifiers. Another embodiment involves adding an adhesive binder to the slurry to enhance retention of the base material in a dry state after drying of the slurry. In a further embodiment, the adhesive binder is selected to facilitate handling of the resultant filter media during manufacture into a filter element for the liquid filtration system, and to enhance retention of the base material in an oil-wetted state. The adhesive binder is preferably selected from the group consisting of acrylic latex, phenolic, butadiene copolymers, vinyl copolymers, latexes, isocyanates, novolacs, and resols, emulsion polymer binders and/or latex resins, including acrylic, vinyl acetate, vinyl chloride, styrene butadiene, poly vinyl alcohol, nitrile, epoxy. A further embodiment involves enhancing retention of the base material in wet, dry and oil-wetted states by: a) adding an ionic additive to the slurry to alter the relative charge between the filter media material and the base material such that one is positively charged and the other is negatively charged such that the base material is attracted to the filter media material to enhance retention of the base material; and b) adding an adhesive binder to the slurry to enhance retention of the base material in a dry state after drying of the slurry. Another embodiment involves adding cationic latex to the slurry to provide cationic groups and a binder. Another embodiment involves adding polyelectrolytes to the slurry to accomplish a dual function of retention of the base material in the wet state and retention of the base material in the dry state, the polyelectrolytes providing both an ionic additive and an adhesive binder to provide the dual function of wet and dry retention of the base material. In a further embodiment, the filter media includes a plurality of fibers, and the base material includes a plurality of particles, and the diameter of the fibers is at least twice as great as the diameter of the particles. In one embodiment, the filter media material is paper made by a paper making process. In a further embodiment, the base material is added by inclusion during the paper making process. In a further embodiment, the filter media material is cellulose. In other embodiments, the filter media material is polyester, polyamide (e.g. nylon), glass, or other filter media materials.

The invention provides a method for making acid-neutralizing filter media for a liquid filter in a liquid filtration system, including providing filter media material in the form of a plurality of fibers, providing acid-neutralizing base material in the form of a plurality of particles in a powder, providing a binder in the form of a resin, combining and mixing a combination of the fibers, the powder, and the resin in a slurry, and drying the slurry to form the filter media. In a further embodiment, a second set of fibers is added to the slurry, namely fibrillated fibers, preferably acrylic. In another embodiment, an ionic additive is added to the slurry to alter the relative charge between the fibers and the particles in the powder such that one is positively charged and the other is negatively charged such that the particles are attracted to and attached to the fibers.

The invention provides a method for attaching an acid-neutralizing base to filter media for a liquid filtration system, including mixing filter media material with acid-neutralizing base material, monitoring the pH of the mixture of the filter media material and the base material, and if the pH is above about 9, adding ionic additive to the mixture to lower the pH to less than about 9.

In one embodiment, the invention provides a method for making a filter with a strong base for reacting with lubricant containing combustion acids neutralized by a weak base to form a neutral salt in an internal combustion engine lubricant circulation system, wherein during circulation of the lubricant the strong base replaces the weak base and retains the combustion acids as immobilized deposits on the filter media, the replaced weak base returning to the circulation system for re-use to neutralize further combustion acids, the method including attaching the strong base to the filter media with strong base material of particle size chosen small enough to enhance chemical activity, retention and immobilization thereof on the filter media and also such that in the event of unintended migration of the particles from the filter media, the particles are small enough to pass through the internal combustion engine lubricant circulation system and return to the filter.

It is recognized that various equivalents, alternatives and modifications are possible within the scope of the appended claims.

What is claimed is:

1. Acid-neutralizing filter media for a liquid filter comprising cellulose filter media fibers of diameter greater than 1 μm in combination with particles of acid-neutralizing base material of diameter less than one-half the diameter of said filter media fibers and attached to and immobilized on said filter media, said filter media further comprising a second set of fibers and an adhesive binder, said second set of fibers having a diameter one order of magnitude smaller than said filter media fibers.

2. The acid-neutralizing filter media according to claim 1 wherein said base material is selected from the group consisting of metal oxides, metal hydroxides, metal carbonates, metal bicarbonates, Lewis bases, sacrificial metals, and mixtures thereof.

3. The acid-neutralizing filter media according to claim 2 wherein said metal oxides are selected from the group consisting of MgO, CaO, MnO, $MnO_2$, ZnO, BaO, $TiO_2$, and said hydroxides and carbonates are selected from the group consisting of $Mg(OH)_2$, $MgCO_3$, $Ca(OH)_2$, $CaCO_3$, $NaAlO_2$, $Na_2CO_3$, NaOH, $Al(OH)_3$, $NaHCO_3$.

4. The acid-neutralizing filter media according to claim 1 wherein said base material is selected from the group consisting of BaO, $CaCO_3$, CaO, $Ca(OH)_2$, $MgCO_3$, $Mg(OH)_2$, MgO, Mg, $NaAlO_2$, $Na_2CO_3$, NaOH, ZnO, Zn, Lewis bases, and mixtures thereof.

5. The acid-neutralizing filter media according to claim 1 wherein said adhesive binder is selected from the group consisting of acrylic latex, phenolic, butadiene copolymers, vinyl copolymers, latexes, isocyanates, novolacs, resols, emulsion polymer binders and latex resins, including acrylic, vinyl acetate, vinyl chloride, styrene butadiene, poly vinyl alcohol, nitrite, and epoxy.

6. The acid-neutralizing filter media according to claim 1 wherein particles are attached to and immobilized on said filter media fibers by both electrostatic attraction between said particles and said filter media fibers and by the adhesive binder.

7. The acid-neutralizing filter media according to claim 1 wherein said adhesive binder is a polyelectrolyte.

8. The acid-neutralizing filter media according to claim 1 wherein said second set of fibers have a diameter smaller than said filter media fibers, to provide a relative coarse and fine fiber matrix combination improving entanglement and capture of said particles of acid-neutralizing base material in said matrix, with said filter media fibers providing the relative coarse fibers, and said second set of fibers providing the relative fine fibers.

9. The acid-neutralizing filter media according to claim 1 wherein said second set of fibers have a diameter in the range 0.5 to 3 μm.

10. The acid-neutralizing filter media according to claim 1 wherein said second set of fibers are fibrillated fibers.

11. The acid-neutralizing filter media according to claim 1 wherein said second set of fibers are fibrillated acrylic fibers.

12. The acid-neutralizing filter media according to claim 1 wherein said second set of fibers are selected from the group consisting of polypropylene, polyethylene, polyaramid, polyamide, and fibrous glass.

13. The acid-neutralizing filter media according to claim 1 wherein said filter media fibers have a diameter in the range of 20 to 30 μm.

14. The acid-neutralizing filter media according to claim 1 wherein said base material comprises $Mg(OH)_2$.

15. Acid-neutralizing filter media for a liquid filter comprising cellulose filter media fibers of diameter greater than 1 μm in combination with particles of acid-neutralizing base material comprising $Mg(OH)_2$, said particles having a diameter less than one-half the diameter of said filter media fibers and attached to and immobilized on said filter media by a second set of fibers and an adhesive binder, said second set of fibers comprising fibrillated acrylic fibers and having a diameter one order of magnitude smaller than said cellulose filter media fibers.

16. The acid-neutralizing filter media according to claim 15 wherein said adhesive binder is selected from the group consisting of acrylic latex, phenolic, butadiene copolymers, vinyl copolymers, latexes, isocyanates, novolacs, resols, emulsion polymer binders and latex resins, including acrylic, vinyl acetate, vinyl chloride, styrene butadiene, poly vinyl alcohol, nitrile, and epoxy.

17. The acid-neutralizing filter media according to claim 15 wherein particles are attached to and immobilized on said filter media fibers by both electrostatic attraction between said particles and said filter media fibers and by the adhesive binder.

18. The acid-neutralizing filter media according to claim 15 wherein said adhesive binder is a polyelectrolyte.

19. The acid-neutralizing filter media according to claim 15 wherein said second set of fibers have a diameter in the range 0.5 to 3 μm.

20. The acid-neutralizing filter media according to claim 15 wherein said filter media fibers have a diameter in the range of 20 to 30 μm.

* * * * *